(12) United States Patent
Takeshima et al.

(10) Patent No.: US 7,790,649 B2
(45) Date of Patent: Sep. 7, 2010

(54) PRODUCTION PROCESS OF EXHAUST GAS PURIFYING CATALYST

(75) Inventors: Shinichi Takeshima, Numazu (JP); Akio Koyama, Yokohama (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 12/302,536

(22) PCT Filed: May 31, 2007

(86) PCT No.: PCT/JP2007/061495

§ 371 (c)(1),
(2), (4) Date: Jun. 4, 2009

(87) PCT Pub. No.: WO2007/139233

PCT Pub. Date: Dec. 6, 2007

(65) Prior Publication Data

US 2009/0298675 A1   Dec. 3, 2009

(30) Foreign Application Priority Data

May 31, 2006   (JP) .............................. 2006-151971

(51) Int. Cl.
*B01J 31/12* (2006.01)
(52) U.S. Cl. .................................................. 502/155
(58) Field of Classification Search ................. 502/155
See application file for complete search history.

(56) References Cited

U.S. PATENT DOCUMENTS

| | | | | |
|---|---|---|---|---|
| 5,733,839 A | * | 3/1998 | Espinoza et al. | ............ 502/336 |
| 6,171,566 B1 | * | 1/2001 | Ku et al. | .................. 423/239.1 |
| 6,372,687 B1 | | 4/2002 | Hagemeyer et al. | |
| 2005/0085649 A1 | * | 4/2005 | Lockemeyer | ............... 549/533 |

FOREIGN PATENT DOCUMENTS

| | | |
|---|---|---|
| EP | 0 562 516 A1 | 9/1993 |
| JP | 53-106682 | 9/1978 |
| JP | 5-261287 | 10/1993 |
| JP | 05261287 | * 12/1993 |
| JP | 11-192432 | 7/1999 |
| JP | 2000-279824 | 10/2000 |
| JP | 2005-296816 | 10/2005 |
| JP | 2006-297236 | 11/2006 |

* cited by examiner

*Primary Examiner*—Melvin C Mayes
*Assistant Examiner*—Stefanie Cohen
(74) *Attorney, Agent, or Firm*—Finnegan, Henderson, Farabow, Garrett & Dunner, LLP (57) ABSTRACT

The present invention relates to a production process of an exhaust gas purifying catalyst, comprising impregnating a support with a solution containing a metal salt and then drying it to load a particle of the metal salt on the support, (a) wherein a base having a less tendency to adsorb and coordinate to the metal salt particle than ammonia is incorporated into the solution to make the solution basic, and thereby the metal salt particle is caused to have a negative zeta potential; or (b) wherein an acid and a base that adsorbs and coordinates to the metal salt particle are incorporated into the solution to make the solution acidic, and thereby the metal salt particle is caused to have a positive zeta potential.

12 Claims, 4 Drawing Sheets

PRODUCTION PROCESS OF EXHAUST GAS PURIFYING CATALYST

CROSS-REFERENCE TO RELATED APPLICATIONS

This application is a national phase application of International Application No. PCT/JP2007/061495, filed May 31, 2007, and claims the priority of Japanese Application No. 2006-151971, filed May 31, 2006, the contents of both of which are incorporated herein by reference.

TECHNICAL FIELD

The present invention relates to a production process of an exhaust gas purifying catalyst, particularly an exhaust gas purifying catalyst comprising barium supported thereon.

BACKGROUND ART

The exhaust gas from an internal combustion engine such as automobile engine contains nitrogen oxide ($NO_x$), carbon monoxide (CO), hydrocarbon (HC) and the like. Therefore, such an exhaust gas is generally released into the atmosphere after the purification with an exhaust gas purifying catalyst capable of oxidizing CO and HC and, at the same time, reducing $NO_x$. As for the exhaust gas purifying catalyst, a catalyst obtained by loading a noble metal such as platinum (Pt), rhodium (Rh) or palladium (Pd) on a porous support such as γ-alumina is generally used.

Also, in recent years, it is known to obtain the exhaust gas purifying catalyst by loading, in combination with the noble metal, an alkali metal and/or an alkaline earth metal on the support. As for such a catalyst using an alkali metal and an alkaline earth metal, there is known an $NO_x$ storage-reduction catalyst that stores $NO_x$ when the air-fuel ratio is in a lean state, and reduces the stored $NO_x$ into $N_2$ when the air-fuel ratio enters a rich state, for example when a rich spike is performed at regular intervals. This $NO_x$ storage-reduction catalyst is a catalyst where a noble metal such as platinum, rhodium and palladium and an $NO_x$ storage material selected from alkali metal and alkaline earth metal elements such as potassium and barium are loaded on a porous oxide support such as alumina.

In the conventional production of the $NO_x$ storage-reduction catalyst, generally, an alumina support coated on a substrate is dipped in a noble metal solution such as aqueous dinitrodiamine platinum nitrate solution, dried and fired, and the support on which a noble metal is thus loaded is dipped in an alkali metal or alkaline earth metal salt solution such as aqueous barium acetate solution, dried and fired to produce the catalyst (see, Japanese Patent No. 3,311,012).

However, it is known that when an exhaust gas purifying catalyst is produced in this way by using a metal salt, particularly a barium salt, as described in Japanese Unexamined Patent Publication No. 2000-279824, such an alkaline earth metal particle exhibits insufficient dispersibility in the obtained exhaust gas purifying catalyst. In this regard, in the prior invention concerned, sintering of platinum is suppressed by using a composite metal colloid such as platinum-rhodium, and barium is loaded to high dispersion in the vicinity of platinum, whereby an automotive exhaust gas purifying catalyst having excellent $NO_x$ storage ability is provided.

Incidentally, as regards high dispersion loading of a catalyst component on a support, in Japanese Unexamined Patent Publication No. 11-192432, a noble metal cluster carbonyl compound is used, and thereby a noble metal is loaded to high dispersion on a support by utilizing large affinity between the compound and the hydroxyl group on the support surface.

DISCLOSURE OF THE INVENTION

As pointed out also in Japanese Unexamined Patent Publication No. 2000-279824, it is known that when an exhaust gas purifying catalyst is produced using a metal salt, particularly a metal salt such as barium salt, dispersibility of the particle of such a metal is sometimes insufficient. Accordingly, the present invention provides a production process of an exhaust gas purifying catalyst, that improves dispersibility of a metal particle in an exhaust gas purifying catalyst.

The present inventors have found that the insufficient dispersibility of a metal particle in an exhaust gas purifying catalyst is attributable to movement of a metal salt particle precipitated at the drying of a metal salt solution, and the movement of a metal salt particle can be suppressed by electrically charging the metal salt particle. Based on the findings, the present inventors have accomplished the present invention. More specifically, the present invention has been devised based on the findings that a metal salt such as barium acetate having relatively small solubility becomes oversaturated in a relatively early stage of drying and precipitates in the form of a metal salt particle and as the solution is dried, the precipitated particles move and aggregate due to the surface tension of the solution; that the metal salt particle bears a small electric charge; and that when electrical charging of the metal salt particle is promoted, movement and aggregation of metal salt particles during drying are suppressed.

The first production process of an exhaust gas purifying catalyst of the present invention is a production process of an exhaust gas purifying catalyst, comprising impregnating a support with a solution containing a metal salt, for example barium acetate, and then drying it to load a metal salt particle on the support, wherein a base having a less tendency to adsorb and coordinate to the metal salt particle than ammonia, for example a quaternary ammonium compound, and optional ammonia are incorporated into the solution to make the solution basic, and thereby the metal salt particle is caused to have a negative zeta potential, particularly a zeta potential smaller than −5 mV.

According to the first production process of an exhaust gas purifying catalyst of the present invention, electrical charging of the metal salt particle can be promoted by suppressing adsorption of the base to the metal salt particle, and thereby movement and aggregation of metal salt particles during drying of the solution can be suppressed by utilizing mutual electrostatic repulsion of metal salt particles.

The first production process of an exhaust gas purifying catalyst of the present invention may further comprise pretreating the support surface, for example pretreating the support surface with an organic base, so that the support has a positive zeta potential when the solution is basic.

According to this embodiment of the first production process of an exhaust gas purifying catalyst of the present invention, coupled with utilization of mutual electrostatic repulsion of metal salt particles, electrostatic attractive force between the support and the metal salt particle may be utilized to suppress the movement and aggregation of metal salt particles during drying of the solution.

The second production process of an exhaust gas purifying catalyst of the present invention is a production process of an exhaust gas purifying catalyst, comprising impregnating a support with a solution containing a metal salt, for example barium acetate, and then drying it to load a metal salt particle on the support, wherein an acid, particularly an acid having the same acid radical as the metal salt, and a base that adsorbs and coordinates to the metal salt particle, for example ammonia or amine, particularly ammonia, are incorporated into the solution to make the solution acidic, and thereby the metal salt particle is caused to have a positive zeta potential, particularly a zeta potential larger than +5 mV.

According to the second production process of an exhaust gas purifying catalyst of the present invention, electrical charging of the metal salt particle can be accelerated by promoting adsorption of the base to the metal salt particle, and thereby movement and aggregation of metal salt particles during drying of the solution can be suppressed by utilizing mutual electrostatic repulsion of metal salt particles.

The second production process of an exhaust gas purifying catalyst of the present invention may further comprise pretreating the support surface, for example pretreating the support surface with an organic acid, so that the support has a negative zeta potential when the solution is made acidic.

According to the second production process of an exhaust gas purifying catalyst of the present invention, coupled with utilization of mutual electrostatic repulsion of metal salt particles, electrostatic attractive force between the support and the metal salt particle may be utilized to suppress the movement and aggregation of metal salt particles during drying of the solution.

Incidentally, the "zeta ($\zeta$) potential" is also called electrokinetic potential and indicates, out of the potential difference at the interface between solid and liquid, a portion effectively acting on the electrokinetic phenomenon. The zeta potential as used in the present invention is a zeta potential measured by a laser Doppler method which is an electrophoretic light scattering method.

BEST MODE FOR CARRYING OUT THE INVENTION

The present invention relates to a production process of an exhaust gas purifying catalyst, comprising impregnating a support with a metal salt-containing solution and drying it to load a metal salt particle on the support.

As regards the first production process of an exhaust gas purifying catalyst of the present invention, in the above-described production process of an exhaust gas purifying catalyst, a base having a less tendency to adsorb and coordinate to the metal salt solution than ammonia is incorporated into the solution to make the solution basic and the metal salt particle is thereby caused to have a negative zeta potential.

As regards the second production process of an exhaust gas purifying catalyst of the present invention, in the above-described production process of an exhaust gas purifying catalyst, an acid and a base that adsorbs and coordinates to the metal salt solution are incorporated into the solution to make the solution acidic, and thereby the metal salt particle is caused to have a positive zeta potential.

In the production process of an exhaust gas purifying catalyst of the present invention, an alkali metal such as potassium, an alkaline earth metal such as barium, a noble metal such as platinum, and/or a transition metal other than the noble metal, such as manganese, can be loaded on a support by using a salt of such a metal. Also, it is of course possible to load a noble metal as in the general production process of an exhaust gas purifying catalyst, and thereafter load another metal such as alkaline earth metal by the production process of an exhaust gas purifying catalyst of the present invention. Furthermore, for example, in the case of loading an alkaline earth metal by the process of the present invention, the solution containing an alkaline earth metal salt may further contain a salt of noble metal, a salt of alkali metal, and the like, so that simultaneously with loading of an alkaline earth metal on a support, other metals such as noble metal and alkali metal can be loaded on the support.

In the production process of an exhaust gas purifying catalyst of the present invention, a metal can be loaded directly on a powdered support. Also, in the production process of an exhaust gas purifying catalyst of the present invention, it is possible to form a catalyst supporting layer by coating a support powder on the surface of a substrate, for example a ceramic-made honeycomb substrate such as cordierite-made honeycomb substrate, and then load a metal on the support of the catalyst supporting layer.

As for the drying and firing conditions used in the production process of an exhaust gas purifying catalyst of the present invention, the conditions generally employed for loading a metal on a support by using a metal salt in the production of an exhaust gas purifying catalyst can be used. Accordingly, for example, drying at 100 to 250° C. for 1 to 3 hours, and firing at 400 to 600° C. for 1 to 3 hours may be performed. Also, in the drying step, for example, a drying method using a microwave may be used.

The materials and the like for use in the production process of an exhaust gas purifying catalyst of the present invention are described in detail below.

<Metal Supported on Support>

In the production process of an exhaust gas purifying catalyst of the present invention, any metal can be used as a metal supported on a support. A metal salt preferably used in the production process of an exhaust gas purifying catalyst of the present invention includes a salt of a metal intended to load in a large amount on a support, a salt of a metal of which salt has a relatively low solubility, and/or a plurality of metal salts that are desired to be simultaneously and uniformly loaded. When loading such a metal salt on a support by using a salt solution, the metal salt generally precipitates as a metal salt particle in a relatively early stage of drying and removal of the solution, and the precipitated particles tend to move and aggregate.

Figure 1:
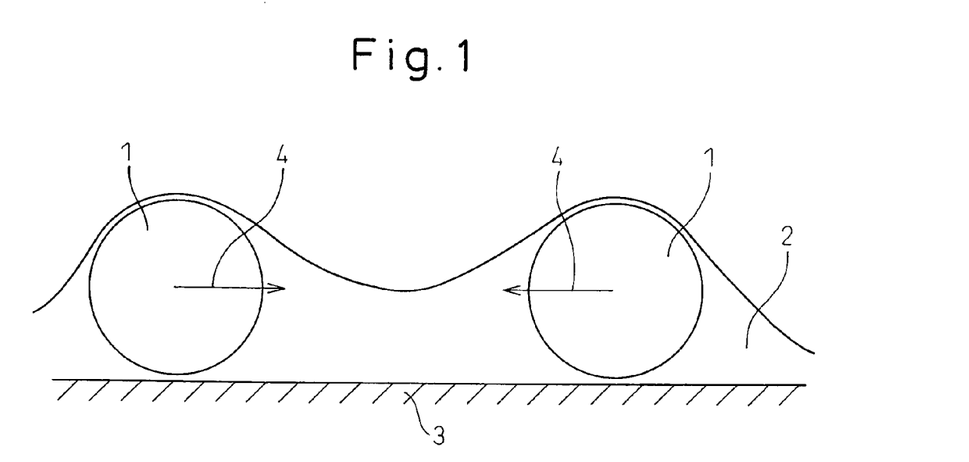
FIG. 1 is a view explaining the moving and aggregating mechanism of metal salt particles in the production of an exhaust gas purifying catalyst using a metal salt.
Figure 2:
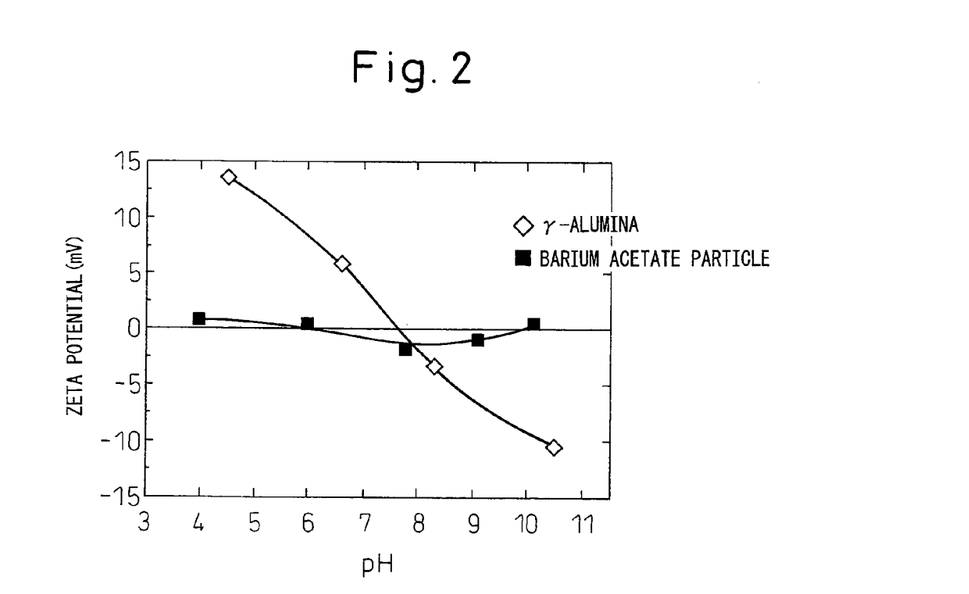
FIG. 2 is a view showing changes in the zeta potential of the general γ-alumina and barium acetate particles with respect to pH.

The moving/aggregating mechanism and zeta potential of the metal salt particle are described by referring to FIGS. 1 and 2. FIG. 1 is a view explaining the moving and aggregating mechanism of metal salt particles in the production of an exhaust gas purification catalyst by using a metal salt, and FIG. 2 is a view showing changes in the zeta potential of the general γ-alumina and barium acetate particle with respect to pH. In FIG. 1, a catalyst support 3, two metal salt particles 1 on the catalyst support 3, and a saturated salt solution 2 are modeled. In the state shown in FIG. 1, the attractive force (shown by arrows 4 in FIG. 1) caused to work between two salt particles by the surface tension of the solution is proportional to the surface tension of the solution.

Incidentally, in the case of a metal salt having a relatively large solubility and scarcely precipitating even in a supersaturated state, the viscosity of the solution is high at the concentration allowing a metal salt particle to precipitate, and therefore the problem due to movement of the particle is relatively insignificant. For reference, solubilities of potassium and barium salts are shown in Table 1 below.

TABLE 1

Solubilities of Potassium Salt and Barium Salt

| | Solubility (g/100 ml-water) | | | |
|---|---|---|---|---|
| | Sulfate | Carbonate | Nitrate | Acetate |
| Potassium (alkali metal) | 2.05 g (25° C.) | 112.1 g (25° C.) | 37.93 g (25° C.) | 217 g (0° C.) |
| Barium (alkaline earth metal) | 0.285 mg (30° C.) | 1.80 mg (25° C.) | 10.2 g (25° C.) | 58.8 g (0° C.) |

The metal salt preferably used in the production process of an exhaust gas purifying catalyst of the present invention includes a metal salt that forms a particle insusceptible to electrical charging irrespective of change in pH of the solution, particularly a carboxylate such as formate, acetate and propionate, for example barium acetate. Such a metal salt particle insusceptible to electrical charging exhibits no electrostatic repulsion between particles, and therefore aggregation of particles with each other cannot be prevented.

In general, a metal oxide particle or the like after firing has a positive zeta potential when the solution containing the particle is acidic, and has a negative zeta potential when the solution containing the particle is basic. That is, a metal oxide particle or the like after firing has, in many cases, such a zeta potential curve as shown in terms of γ-alumina in FIG. 2. On the other hand, a metal salt particle precipitated along with drying of the salt solution sometimes exhibits such a zeta potential curve as shown in terms of barium acetate in FIG. 2. Incidentally, the zeta potential curves shown in FIG. 2 are obtained by using acetate and aqueous ammonia as the acid and the base, respectively, to adjust the pH.

This is considered because, in a metal oxide particle or the like after firing, the surface hydroxyl group is decreased, whereas, in a metal salt particle precipitated along with drying of the salt solution, the periphery of a particle is hydrated to allow ammonium ion ($NH_4^+$), acetate ion ($CH_3COO^-$) or the like to coordinate to the hydrated portion on the metal salt particle surface, and thereby the electrical charge of the particle is neutralized.

Accordingly, as understood from the above, the metal salt preferably used in the production process of an exhaust gas purifying catalyst of the present invention specifically includes a salt of a transition metal except for a noble metal, and an alkaline earth metal salt, particularly a carboxylate.

The alkaline earth metal includes calcium (Ca), strontium (Sr), barium (Ba) and radium (Ra). Generally, in usage for an exhaust gas purifying catalyst, barium is preferred in terms of the $NO_x$ storage performance. In the case of loading barium on a support by the process of the present invention, barium acetate or barium nitrate, particularly barium acetate, is preferably used as the barium salt in view of solubility of the salt, easy firing and the like.

The transition metal includes any transition metal used in the usage for an exhaust gas purifying catalyst, such as manganese, chromium and vanadium.

The metal salt for use in the process of the present invention may be used in the solution at any concentration, particularly at a concentration generally employed in the production of an exhaust gas purifying catalyst. The concentration of the metal salt in the solution can be determined by taking into consideration the amount of the metal to be supported on the support.

<Support>

As regards the support for use in the process of the present invention, a support, particularly a powdered support, such as metal oxide support generally employed for the production of an exhaust gas purifying catalyst, or a support layer formed by shaping or coated on a substrate, may be used. Examples of the metal oxide support include a support selected from the group consisting of alumina, silica, silica-alumina, zeolite, mordenite, titania, ceria and zirconia, particularly an alumina support.

<Base Usable in the First Process of the Present Invention>

The base having a less tendency to adsorb and coordinate to the metal salt particle than ammonia include a base selected from the group consisting of an amine and a quaternary ammonium compound, particularly a tertiary or quaternary ammonium compound, more particularly a quaternary ammonium compound. The ammonium ion obtained when such a base is dissolved in an aqueous solution is unlikely to coordinate and adsorb to the metal salt particle than ammonium ion obtained from ammonia, due to steric hindrance. In particular, the tendency to adsorb and coordinate to the metal salt particle is small in a quaternary ammonium ion compound, because a nitrogen atom is sterically shielded. Accordingly, such a base enables the metal salt particle to have a negative zeta potential, for example a zeta potential of −5 mV or less, −7 mV or less, or −10 mV or less, at a basic pH.

Specific examples of the amine include primary to tertiary amines, for example a tertiary amine such as trimethylamine, triethylamine and tripropylamine. Specific examples of the quaternary ammonium compound include a hydroxide or salt of tetramethylammonium, tetraethylammonium, tetrapropylammonium, dibenzyldimethylammonium, choline and the like.

The base having a relatively small tendency to adsorb can be used in an amount providing a solution that is sufficiently basic to allow for electrical charging of the precipitated metal salt particle. Accordingly, for example, the base may be used in an amount giving a solution with a pH value of more than 7.5, more than 8, or more than 9. In combination with the base having a relatively small tendency to adsorb, ammonia may also be used. In this embodiment, using inexpensive ammonia, the benefits of the first process of the present invention can be obtained by virtue of the relatively low ammonia concentration.

<Treatment of Support Surface in the First Process of the Present Invention>

In the case of allowing the precipitated metal salt particle to have a negative zeta potential by using the first process of the present invention, the support surface is preferably pretreated, so that the support has a positive zeta potential, for example a zeta potential of more than +5 mV, more than +7 mV, or more than +10 mV when the solution is made basic.

This pretreatment of the support can be performed using an organic base, for example a quaternary ammonium compound such as tetraethylammonium. Specifically, the pretreatment may be performed by dissolving the organic base in a solvent to obtain a solution, impregnating the support with the obtained solution, and drying the support. In the case where the support pretreated is a metal oxide support, it is sometimes preferred to select a compound capable of, for example, adsorbing or bonding to the hydroxyl group on the support surface, such as organic base having a hydroxyl group.

Specific examples of the quaternary ammonium compound include a hydroxide or salt of benzalkonium, choline, tetramethylammonium, tetraethylammonium tetrapropylammonium and dibenzyldimethylammonium, particularly benzalkonium chloride and choline chloride. As described above, when the support is a metal oxide support, use of a quaternary ammonium compound having a hydroxyl group, such as choline chloride, is sometimes preferred in terms of adsorption to the support surface.

<Base Usable in the Second Process of the Present Invention>

The base which can be used in the second process of the present invention includes a base selected from the group consisting of ammonia and an amine, particularly ammonia. The ammonium ion obtained when such a base is dissolved in an aqueous solution can coordinate and adsorb to the metal salt particle, and thereby enables the metal salt particle to be electrically charged relatively positive.

As regards the amine for use in the second process of the present invention, an amine having a relatively short alkyl chain is preferred in view of water solubility. Specific examples of the amine include methylamine, ethylamine, propylamine, ethylenediamine, propylamine, diethylamine, benzylamine, pyridine and piperidine.

The ammonia or amine can be used in an amount capable of giving a sufficiently positive electric charge to the metal salt particle. Accordingly, the amount of the ammonia or amine used is dependent on, for example, the extent that the compound is coordinated and adsorbed to the metal salt particle, or the amount of the metal salt particle precipitated.

<Acid Usable in the Second Process of the Present Invention>

In the second process of the present invention, any acid can be used. The acid which can be used here includes an inorganic acid such as hydrochloric acid, nitric acid and sulfuric acid, and an organic acid such as carboxylic acid. The acid used is preferably an acid having no adverse effect on the obtained catalyst, particularly an organic acid such as carboxylic acid. Examples of the carboxylic acid include an alicylcic carboxylic acid such as formic acid, acetic acid, propionic acid and butyric acid.

In the case where this acid reacts with the metal salt used in the second process of the present invention to form a salt having a relatively low solubility, the newly formed salt precipitates in an early stage. Therefore, in order to avoid precipitation of such a base in an early state, it is preferred in some cases to use an acid having the same acid radical (conjugated base) as the metal salt use in the process of the present invention. That is, for example, when barium is loaded on a support by using barium acetate in the production process of an exhaust gas purifying catalyst of the present invention, acetic acid is sometimes preferably used as the acid in the second process of the present invention.

The acid usable in the second process of the present invention can be used in an amount providing a solution that is sufficiently acidic to allow for electrical charging of the precipitated metal salt particle. Therefore, the acid may be used in an amount giving a solution with a pH value of less than 6.5, or less than 6.

<Treatment of Support Surface in the Method Comprising The Second Process of the Present Invention>

In the case of allowing the precipitated metal salt particle to have a positive zeta potential by using the second process of the present invention, the support surface is preferably pretreated, so that the support has a negative zeta potential, for example a zeta potential of less than −5 mV, less than −7 mV, or less than −10 mV when the solution is made acidic.

This pretreatment of the support can be performed using an organic acid. Specifically, the pretreatment may be performed by dissolving the organic base in a solvent to obtain a solution, impregnating the support with the obtained solution, and drying the support.

Specific examples of the organic acid include a carboxylic acid such as formic acid, acetic acid, propionic acid, butyric acid, oxalic acid, citric acid, succinic acid, adipic acid, azelaic acid, sebacic acid, maleic acid, fumaric acid, phthalic acid, terephthalic acid, isophthalic acid and trimellitic acid. A polyvalent carboxylic acid such as oxalic acid, maleic acid, fumaric acid and terephthalic acid, particularly a polyvalent carboxylic acid having a double bond, such as maleic acid and fumaric acid, is preferred in view of adsorption to the surface of the support, particularly a metal oxide support.

EXAMPLES

The present invention is described below based on Comparative Examples and Examples, but the present invention is not limited thereto.

<Evaluation of Zeta Potential of Barium Acetate Particle>

In the following, the zeta potential of a barium acetate particle is evaluated using Comparative Example 1 and Examples 1 and 2.

Comparative Example 1

In this comparative example, a barium acetate particle-containing solution was produced by previously putting a barium acetate solution in a supersaturated state through drying. By adjusting the pH of the barium acetate particle-containing solution, the relationship between the pH of the solution and the zeta potential of the barium acetate particle was examined. Incidentally, aqueous ammonia was used when making the solution basic, and acetic acid was used when making the solution acidic. The change in zeta potential of the barium carbonate particle of Comparative Example 1 with respect to the pH is shown in FIG. 3 together with the results of Examples 1 and 2.

Figure 3:
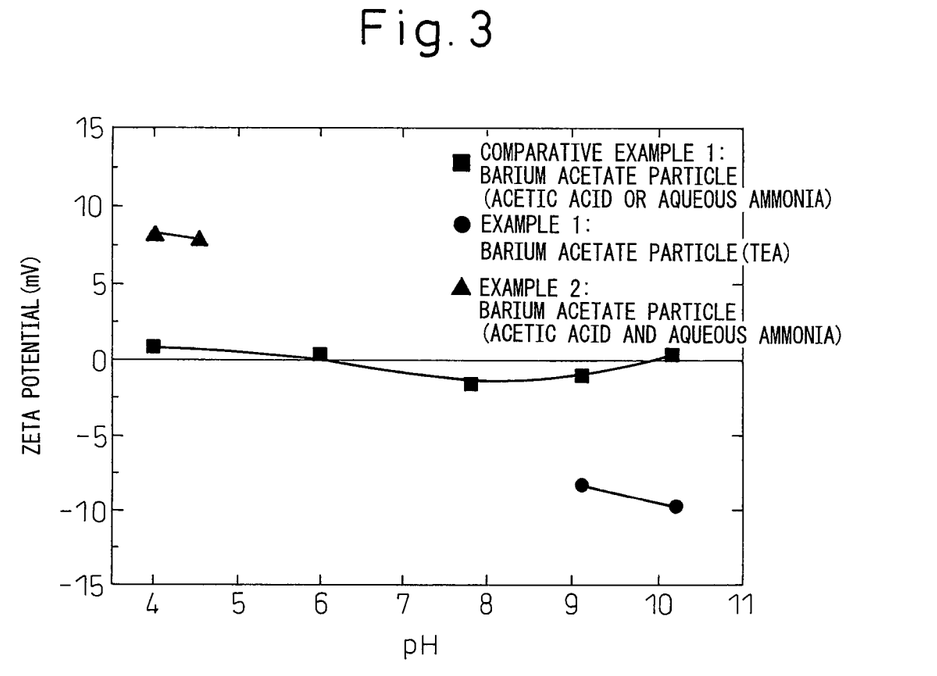
FIG. 3 is a view showing changes in the zeta potential of the barium acetate particles in Comparative Example 1 and Examples 1 and 2 with respect to pH.

As understood from FIG. 3, the zeta potential of the barium acetate particle was almost constant despite change in the pH value of the solution. This is considered because when the solution is basic, ammonium ion as positive ion coordinates and adsorbs to the barium acetate particle surface to negate the electrical negative charging of the particle, whereas when the solution is acidic, acetate ion as negative ion coordinates and adsorbs to the barium acetate ion particle to negate the electrical positive charging of the particle.

Example 1

This Example was performed in the same manner as the comparative example except that the barium acetate particle-containing solution was made basic (pH: 9 or 10) by using tetraethylammonium (TEA) in place of ammonia. The change in zeta potential of the barium carbonate particle of Example 1 with respect to pH is shown in FIG. 3, together with the results of Comparative Example 1 and Example 2.

As understood from FIG. 3, the zeta potential of the barium acetate particle was a relatively large negative value. This is considered to be attributable to the fact that tetraethylammonium ion has a small tendency to coordinate and adsorb to the barium acetate particle.

Example 2

This Example was performed in the same manner as the comparative example except that, along with making the barium acetate particle-containing solution acidic by using acetic acid, ammonia was added to the solution. In this Example, the pH was adjusted to 4 and 4.5. The change in zeta potential of the barium carbonate particle of Example 2 with respect to pH is shown in FIG. 3, together with the results of Comparative Example 1 and Example 1

As understood from FIG. 3, the zeta potential of the barium acetate particle was a relatively large positive value. This is considered to be attributable to the fact that ammonium ion as positive ion is coordinated and adsorbed to the barium acetate particle.

<Evaluation of Zeta Potential of Barium Acetate Particle>

In the following, the effect of suppressing coarsening of a barium carbonate particle by the process of the present invention is evaluated using Comparative Example 2 and Examples 3 to 6.

Comparative Example 2

In this comparative example, a barium acetate particle-containing solution was produced by previously putting a barium acetate solution in a supersaturated state through drying. This barium acetate particle-containing solution was, without adjusting the pH, impregnated into a γ-alumina support not subjected to a surface treatment, and the support was dried in circulating air at 250° C. and fired in air to obtain a barium-supported γ-alumina support. The thus-obtained barium-supported γ-alumina support was subjected to endurance under heating at 700° C. over 50 hours in air. The barium acetate supported on the γ-alumina support was changed into barium carbonate by the firing and endurance in air. After the endurance, the particle diameter of the barium carbonate particle was measured using an X-ray diffraction method. The outlined experimental conditions and the results of X-ray diffraction analysis are shown in Table 2 below.

Example 3

Figure 4:
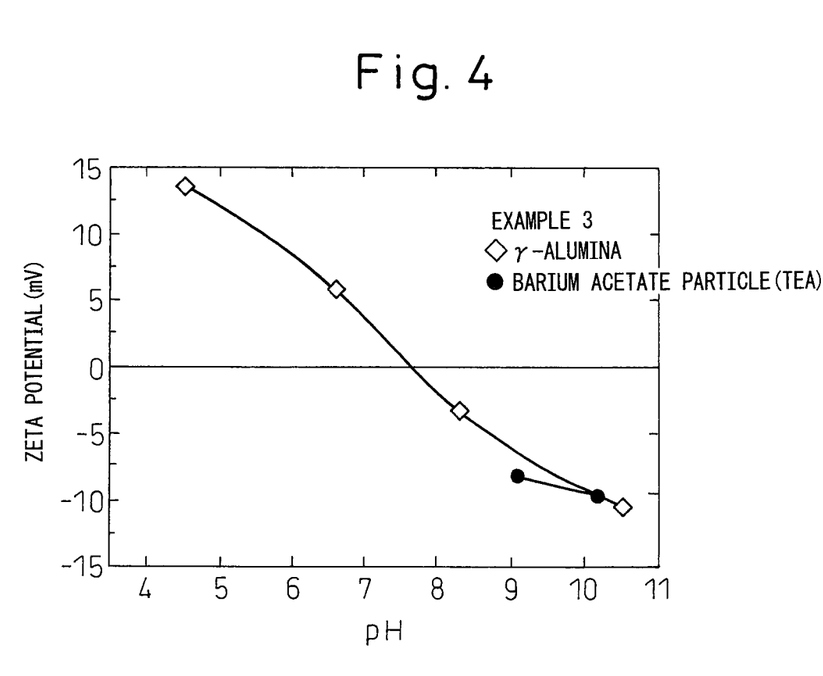
FIG. 4 is a view showing changes in the zeta potential of the γ-alumina support and barium acetate particle of Example 3 with respect to pH.

A barium-supported γ-alumina support was obtained in the same manner as in Comparative Example 2 except that the pH of the barium acetate particle-containing solution was adjusted to be from 9 to 10 by adding tetraethylammonium (TEA) to the solution. The obtained barium-supported γ-alumina support was subjected to endurance. After the endurance, the particle diameter of the barium carbonate particle was measured using an X-ray diffraction method. The outlined experimental conditions and the results of X-ray diffraction analysis are shown in Table 2 below. Also, the changes in zeta potential of the γ-alumina support and barium acetate particle used in Example 3 with respect to the pH value are shown in FIG. 4.

Example 4

Figure 5:
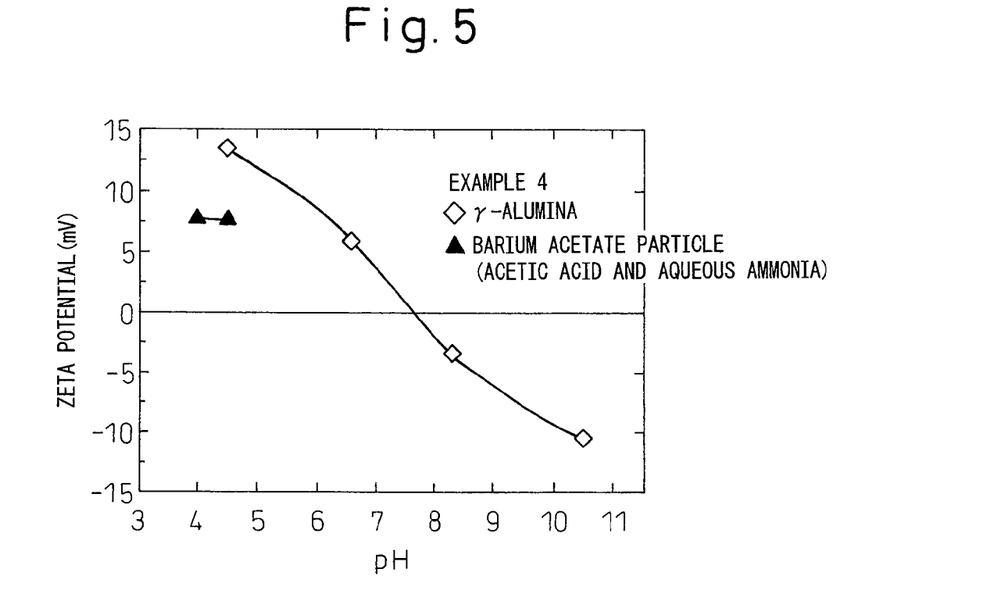
FIG. 5 is a view showing changes in the zeta potential of the γ-alumina support and barium acetate particle of Example 4 with respect to pH.

A barium-supported γ-alumina support was obtained in the same manner as in Comparative Example 2 except that an equimolar amount of aqueous ammonia was added to the barium acetate particle-containing solution and the pH of the solution was then adjusted to be from 4 to 4.5 by adding acetic acid. The obtained barium-supported γ-alumina support was subjected to endurance. After the endurance, the particle diameter of the barium carbonate particle was measured using an X-ray diffraction method. The outlined experimental conditions and the results of X-ray diffraction analysis are shown in Table 2 below. Also, the changes in zeta potential of the γ-alumina support and barium acetate particle used in Example 4 with respect to the pH value are shown in FIG. 5.

Example 5

A γ-alumina support was impregnated with a solution containing 0.5 mol/L of tetraethylammonium in ethanol and dried at 120° C. to obtain a γ-alumina support which was surface-treated with tetraethylammonium.

A barium-supported γ-alumina support was obtained in the same manner as in Example 3 except that the γ-alumina support which was surface-treated with tetraethylammonium (TEA) was used. The obtained barium-supported γ-alumina support was subjected to endurance. After the endurance, the particle diameter of the barium carbonate particle was measured using an X-ray diffraction method. The outlined experimental conditions and the results of X-ray diffraction analysis are shown in Table 2 below. Also, the changes in zeta potential of the γ-alumina support and barium acetate particle used in Example 5 with respect to the pH value are shown in FIG. 6.

Figure 6:
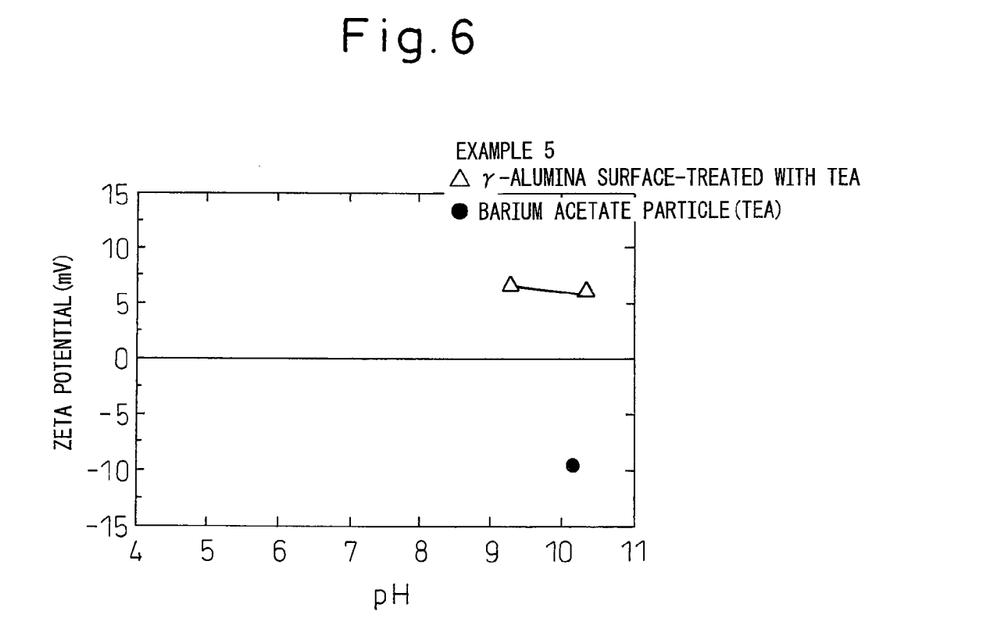
FIG. 6 is a view showing changes in the zeta potential of the γ-alumina support and barium acetate particle of Example 5 with respect to pH.

As understood from FIG. 6, by previously treating the γ-alumina support with tetraethylammonium, the support has a positive zeta potential at a basic pH.

Example 6

A γ-alumina support was impregnated with a solution containing 0.5 mol/L of fumaric acid in ethanol and dried at 120° C. to obtain a γ-alumina support which was surface-treated with fumaric acid.

A barium-supported γ-alumina support was obtained in the same manner as in Example 4 except that the γ-alumina support which was surface-treated with fumaric acid was used. The obtained barium-supported γ-alumina support was subjected to endurance. After the endurance, the particle diameter of the barium carbonate particle was measured using an X-ray diffraction method. The outlined experimental conditions and the results of X-ray diffraction analysis are shown in Table 2 below. Also, the changes in zeta potential of the γ-alumina support and barium acetate particle used in Example 6 with respect to the pH value are shown in FIG. 7.

Figure 7:
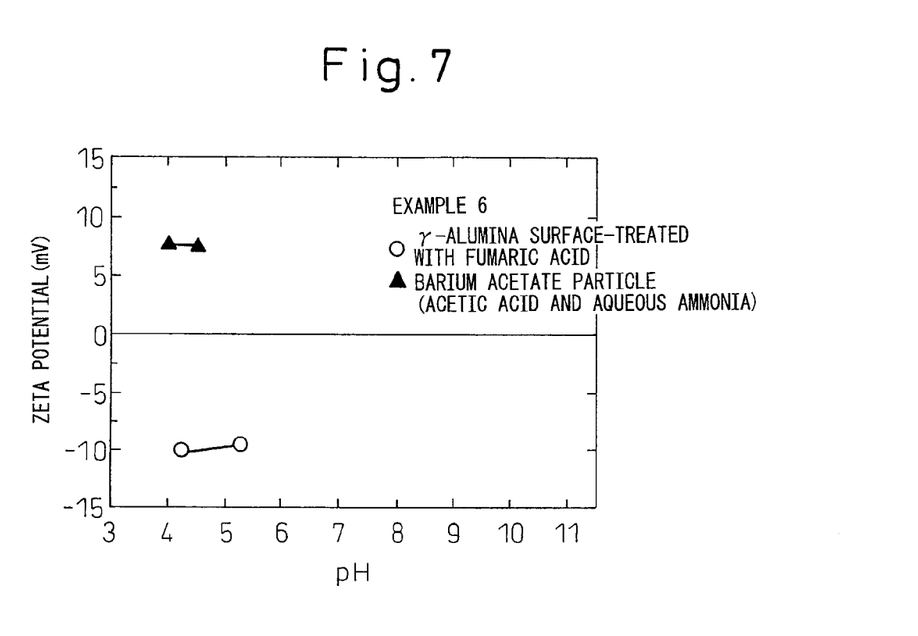
FIG. 7 is a view showing changes in the zeta potential of the γ-alumina support and barium acetate particle of Example 6 with respect to pH.

As understood from FIG. 7, by previously treating the γ-alumina support with fumaric acid, the support has a negative zeta potential at an acidic pH.

TABLE 2

Outlined Experimental Conditions and
Results of X-Ray Diffraction Analysis

| | Barium Acetate Solution | | | Particle |
|---|---|---|---|---|
| | Added Component | pH | Alumina Support | Diameter After Endurance (nm) |
| Comparative Example 2 | none | — | untreated | 55.6 |
| Example 3 | TEA* | basic | untreated | 33.5 |
| Example 4 | acetic acid + ammonia | acidic | untreated | 36.4 |
| Example 5 | TEA | basic | surface-treated with TEA | 24.5 |
| Example 6 | acetic acid + ammonia | acidic | surface-treated with fumaric acid | 24.3 |

TEA*: tetraethylammonium

As understood from Table 2, in comparison with a case of not electrically charging the barium acetate particle as in Comparative Example 2, aggregation and coarsening of the barium carbonate particle are suppressed when the barium acetate particle is electrically charged as in Examples 3 to 6. Out of Examples 3 to 6, in Examples 5 and 6 where, in addition to electrical charging of the barium acetate particle, the support is electrically charged opposite to the barium acetate particle, aggregation and coarsening of the barium carbonate particle are particularly suppressed.

<Evaluation of Exhaust Gas Purifying Catalyst>

In Comparative Example 3 and Example 7 below, the exhaust gas purification performance of the exhaust gas purifying catalyst obtained by the process of the present invention is evaluated.

Comparative Example 3

An alumina support coated on a cordierite-made honeycomb substrate was dipped in an aqueous dinitrodiammine platinum nitrate solution, then dried and fired to obtain a platinum-supported support. This platinum-supported support was dipped in an aqueous solution containing potassium acetate and barium acetate, then dried and fired to produce an $NO_x$ storage-reduction catalyst. In the produced $NO_x$ storage-reduction catalyst, 2 g of platinum/L-support, 0.1 mol of potassium/L-support and 0.2 mol of barium/L-support were supported.

Figure 8:
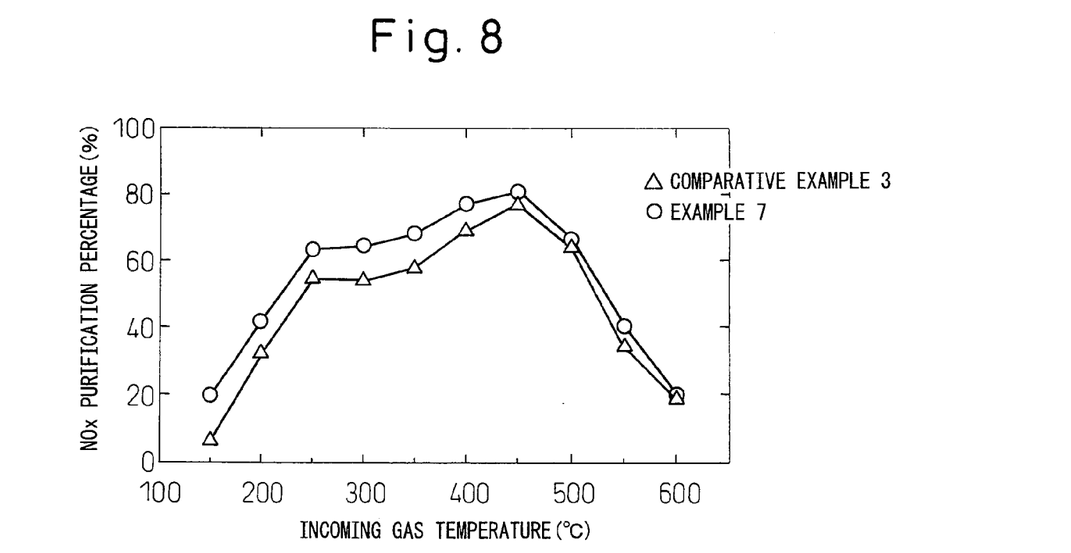
FIG. 8 is a view showing the $NO_x$ purification percentage by exhaust gas purifying catalysts of Comparative Example 3 and Example 7.

The thus-obtained $NO_x$ storage-reduction catalyst was subjected to endurance at 750° C. over 20 hours in air. An exhaust gas from a direct-injection engine of 2 liter displacement was fed to the $NO_x$ storage-reduction catalyst after the endurance, and the $NO_x$ purification percentage at an exhaust gas temperature of 150 to 600° C. was evaluated. The outlined experimental conditions are shown in Table 3. Also, the $NO_x$ purification percentage by the exhaust gas purifying catalyst of Comparative Example 3 is shown in FIG. 8 together with the results of Example 7.

Example 7

An $NO_x$ storage-reduction catalyst was obtained, subjected to endurance and evaluated for $NO_x$ purification percentage in the same manner as in Comparative Example 3, except that acetic acid and ammonia were added to the barium acetate particle-containing solution and a γ-alumina particle was surface-treated with fumaric acid in the same manner as in Example 6. The outlined experimental conditions are shown in Table 3. Also, the $NO_x$ purification percentage by the exhaust gas purifying catalyst of Example 7 is shown in FIG. 8 together with the results of Comparative Example 3.

TABLE 3

Outlined Experimental Conditions

| | Barium Acetate Solution | | |
|---|---|---|---|
| | Added Component | pH | Alumina Support |
| Comparative Example 3 | none | — | untreated |
| Example 7 | acetic acid + ammonia | acidic | surface-treated with fumaric acid |

<Evaluation of Electrical Chargeability of Particle>

In Example 8 below, it is confirmed that even when acetic acid and ammonia are previously incorporated in the drying step where the particle precipitates, the particle can be electrically charged similarly to the case of incorporating acetic acid and ammonia into the particle-containing solution as in Example 2.

Example 8

To a barium acetic saturated solution in which a barium acetate particle was remaining, aqueous ammonia was added to give a concentration of 0.05 M and acetic acid was further added such that the pH of the solution became 5.5. Thereafter, the solution was stirred to obtain a barium acetate saturated solution containing acetic acid and ammonia. At this time, the pH of the saturated solution was 5.7. After obtaining a supernatant solution from this saturated salt solution, the supernatant solution was dried by spraying it into a stream of air heated by a drier, and the residual solution was recovered. Here, the stream of air heated by a drier had a temperature of about 120° C. in the supernatant solution-spraying part.

Using a dynamic light scattering meter, the presence of fine particles in the obtained residual solution was confirmed. Thereafter, the electrically charged state of the fine particle was evaluated by an electrophoretic light scattering meter. As a result, the fine particle was electrically charged to +17.5 mV. Accordingly, it was confirmed that even when acetic acid and ammonia are previously incorporated in the drying step where the particle precipitates, the particle can be electrically charged similarly to the case of incorporating acetic acid and ammonia into the particle-containing solution.

The invention claimed is:

1. A production process of an exhaust gas purifying catalyst, comprising impregnating a support with a solution containing a metal salt and then drying it to load a particle of said metal salt on said support,
   wherein a base having a less tendency to adsorb and coordinate to said metal salt particle than ammonia is incorporated into said solution to make said solution basic, and thereby said metal salt particle is caused to have a negative zeta potential of less than −5 mV.

2. The production process of an exhaust gas purifying catalyst according to claim 1, wherein said base is a quaternary ammonium compound.

3. The production process of an exhaust gas purifying catalyst according to claim 1, wherein said metal salt comprises barium acetate.

4. The production process of an exhaust gas purifying catalyst according to claim 1, wherein said process further comprises pretreating the surface of said support so that said support has a positive zeta potential when said solution is basic.

5. The production process of an exhaust gas purifying catalyst according to claim 4, wherein said pretreatment of the support surface is performed using an organic base.

6. A production process of an exhaust gas purifying catalyst, comprising impregnating a support with a solution containing a metal salt and then drying it to load a particle of said metal salt on said support,
   wherein an acid and a base that adsorbs and coordinates to said metal salt particle are incorporated into said solution to make said solution acidic, and thereby said metal salt particle is caused to have a positive zeta potential larger than +5 mV.

7. The production process of an exhaust gas purifying catalyst according to claim 6, wherein said base is ammonia or ammine.

8. The production process of an exhaust gas purifying catalyst according to claim 6, wherein said metal salt contains barium acetate.

9. The production process of an exhaust gas purifying catalyst according to claim 6, wherein said base is ammonia.

10. The production process of an exhaust gas purifying catalyst according to claim 6, wherein the acid radical of said acid is the same as the acid radical of said metal salt.

11. The production process of an exhaust gas purifying catalyst according to claim 6, wherein said process further comprises pretreating the surface of said support so that said support has a negative zeta potential when said solution is acidic.

12. The production process of an exhaust gas purifying catalyst according to claim 11, wherein said pretreatment of the support surface is performed using an organic acid.

* * * * *